(12) United States Patent  
Bush et al.

(10) Patent No.: US 7,817,178 B2
(45) Date of Patent: Oct. 19, 2010

(54) THERMAL COMPENSATION OF BI-DIRECTIONAL ALIGNMENT IN A BI-DIRECTIONAL LASER SCANNING UNIT

(75) Inventors: Craig P. Bush, Lexington, KY (US); Eric W. Westerfield, Versailles, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 11/511,716

(22) Filed: Aug. 29, 2006

(65) Prior Publication Data

US 2008/0055389 A1    Mar. 6, 2008

(51) Int. Cl.
B41J 2/47 (2006.01)
B41J 15/14 (2006.01)
B41J 2/435 (2006.01)
G02B 26/08 (2006.01)

(52) U.S. Cl. .................. 347/243; 347/235; 347/250; 359/197.1; 359/204.1; 359/212.1; 359/213.1; 359/214.1; 359/223.1

(58) Field of Classification Search ................ None
See application file for complete search history.

(56) References Cited

U.S. PATENT DOCUMENTS

| | | | |
|---|---|---|---|
| 6,919,977 B2 | 7/2005 | Cannon et al. | |
| 7,570,386 B2 | 8/2009 | Heink et al. | |
| 2004/0119002 A1 | 6/2004 | Bush et al. | |
| 2004/0119811 A1 | 6/2004 | Bush et al. | |
| 2004/0119813 A1* | 6/2004 | Bush et al. | 347/259 |
| 2004/0125198 A1 | 7/2004 | Klement | |
| 2004/0165017 A1* | 8/2004 | Ogino et al. | 347/14 |
| 2006/0064019 A1 | 3/2006 | Bush et al. | |
| 2006/0114309 A1 | 6/2006 | Bush | |
| 2008/0055389 A1 | 3/2008 | Bush et al. | |
| 2008/0055390 A1 | 3/2008 | Bush et al. | |
| 2008/0055392 A1 | 3/2008 | Bush et al. | |
| 2008/0055393 A1 | 3/2008 | Bush et al. | |

\* cited by examiner

*Primary Examiner*—Matthew Luu
*Assistant Examiner*—Kendrick X Liu

(57) ABSTRACT

Methods and apparatus include improving print quality of a bi-directionally scanning electrophotographic (EP) device, such as a laser printer or copy machine, according to temperature. A moving galvanometer or oscillator reflects a laser beam to create forward and reverse scan lines of a latent image. During use, the actual ambient temperature is obtained and used make corrections to improve print quality, such as by producing the latent image with a signal altered from an image data input signal to help ensure proper alignment of the forward and reverse scan lines.

14 Claims, 7 Drawing Sheets

THERMAL COMPENSATION OF BI-DIRECTIONAL ALIGNMENT IN A BI-DIRECTIONAL LASER SCANNING UNIT

FIELD OF THE INVENTION

Generally, the present invention relates to electrophotographic (EP) devices, such as laser printers or copy machines. Particularly, it relates to improving print quality in electrophotographic devices utilizing bidirectional scanning. In one aspect, ambient operating temperature is obtained and corrections implemented. In still other aspects, information for scanning is altered according to expected misalignments per the ambient operating temperature.

BACKGROUND OF THE INVENTION

Typical electrophotographic (EP) devices have a spinning polygon mirror for directing a laser beam on a photoconductor, such as a drum, to create one or more scan lines of a latent to-be-printed image. With reference to FIG. 1, multiple scan lines (1-6) are shown and all extend in the direction of the arrows left-to-right in the scanning direction 10. Conveniently, common referencing of all scan lines can occur relative to a single laser beam sensor position 12, known commonly as a horizontal synchronization (or "hsync") position. Often, the hsync signal is defined in units of time for the engine of the EP device and its apparent location exists in a space somewhere off the edge of the printed page.

Recently, it has been suggested that torsion oscillator or resonant galvanometer structures can replace the traditional spinning polygon mirror as the means for generating scan lines on the photoconductor. In this manner, scan lines occur in both the forward and backward directions (e.g., bi-directionally) thereby increasing efficiency of the EP device. Due to their small size and less involved fabrication techniques, the structures are also fairly suggested to reduce the relative cost of manufacturing. However, scanning in two directions adds complexity to image referencing since two reference points need occur at opposite ends of the printed page and even the slightest of deviations between scan lines amplifies print image imperfections. Moreover, scanning is influenced by temperature, which thus affects the magnitude of the scan line misalignment.

Accordingly, there exists a need in the art for adjusting for the manner in which bi-directionally scanning EP devices should operate according to temperature. Particularly, there are needs by which knowing the actual operating temperature of the EP device will relate to making corrections to improve print quality. Ultimately, the need extends to accurately aligning and registering the pixel information of the forward and reverse bi-directional scan lines. Naturally, any improvements should further contemplate good engineering practices, such as relative inexpensiveness, stability, low complexity, ease of implementation, etc.

SUMMARY OF THE INVENTION

The above-mentioned and other problems become solved by applying the principles and teachings associated with the hereinafter described bi-directionally scanning electrophotographic (EP) devices, such as laser printers or copier machines, corrected per ambient operating temperature. In a most basic sense, an EP device is pre-characterized such that temperature correlates to expected misalignment of scan lines. Based upon attainment of actual ambient operating conditions, the EP device under consideration is corrected to prevent or otherwise overcome the expected misalignment.

In this regard, an EP device includes a scanning mechanism in the form of a moving galvanometer or oscillator that reflects a laser beam to create scan lines of a latent image in opposite directions. The ambient temperature is measured and compared to a pre-characterization of scan line misalignment with regard to variations in temperature. Corrections to improve print quality then occur according to the characterization. Certain corrections include producing the latent image with a signal altered from an image data input signal. Especially, pixels of image data input are delayed to the presentation of the laser beam.

In one specific embodiment, implementing the correction comprises correlating positional misalignment to a signal for operating a laser to make one of the forward and reverse scan lines. Implementing the correction may comprise delaying the creation of a first pixel of a latent image in a forward scanning direction, in a reverse scanning direction, or both. Preferably, implementing the correction comprises comparing the obtained temperature (preferably taken after the device powers on) to a temperature at which the forward and reverse scan lines generally align, and then determining the amount of a correction necessary based on the comparison (that is, the difference between the obtained temperature and the temperature at which alignment was generally achieved). To accomplish this, the method further includes storing in a memory the temperature at which the forward and reverse scans generally align.

The invention in another aspect comprises a bi-directionally scanning electrophotographic device. The device includes a photoconductor for receiving a plurality of scan lines formed in opposite directions to create a latent image. To produce the latent image on the photoconductor, a controller uses a signal altered from an image data input signal so as to include pixel information delayed by an amount correlated to a positional misalignment as a function of a temperature in which the device is operated.

The algorithm may calculate the amount of the signal altered as a fractional amount of the pixel information, and may also adjust the forward scan line, the reverse scan line, or both, to make the desired alignment. To obtain the ambient temperature, a sensor is provided, preferably within the machine and relatively close to the scanning mechanism for producing the scan lines. Memory may also be provided to store a temperature value corresponding to the alignment of the forward and reverse scan lines. In such case, the algorithm compares the temperature with the stored temperature value at alignment to determine the misalignment among the forward and reverse scan lines.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, software, and/or other changes may be made without departing from the scope of the present invention. In accordance with the present invention, a bi-directionally scanning electrophotographic (EP) device corrected per ambient operating conditions, such as pressure and temperature, is hereafter described.

Figure 1:
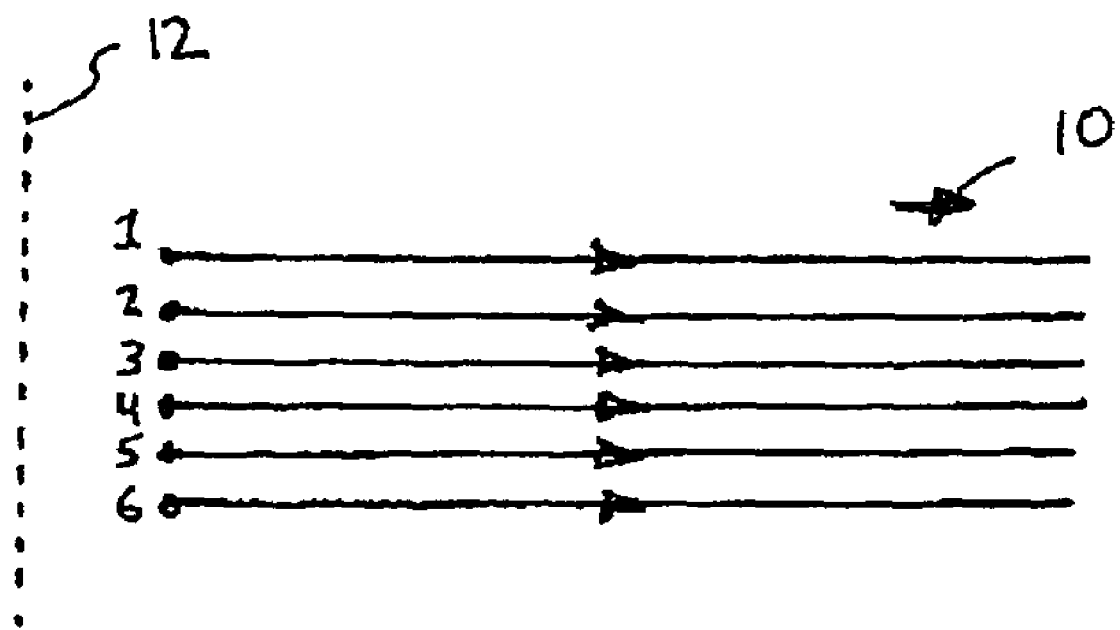
FIG. 1 is a diagrammatic view in accordance with the prior art of the scan lines and reference position of a conventional electrophotographic (EP) device.
Figure 2:
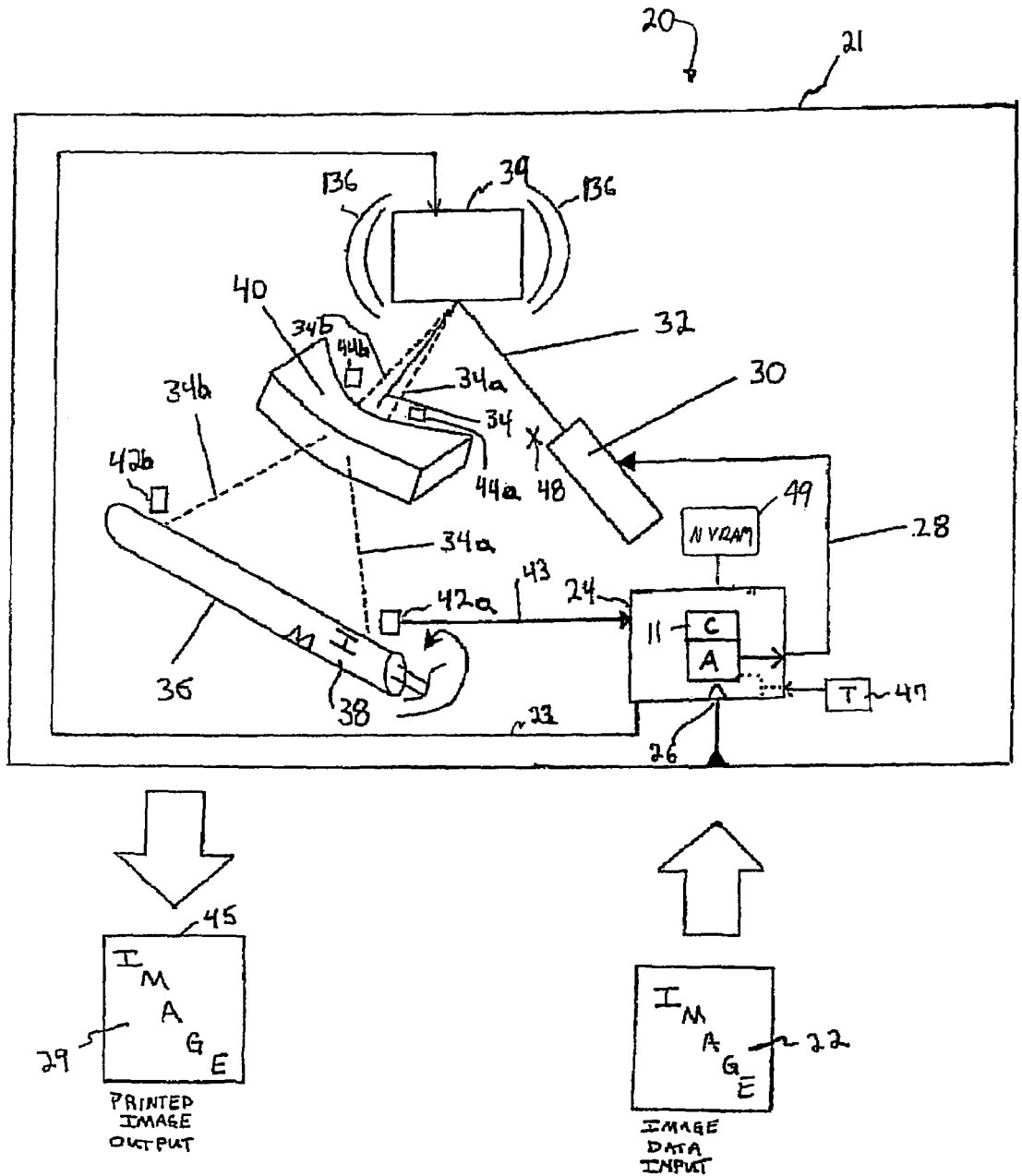
FIG. 2 is a diagrammatic view in accordance with the present invention of a representative bi-directionally scanning EP device.

With reference to FIG. 2, an EP device 20 of the invention representatively includes mono or color laser printers or copier machines. During use, image data 22 is supplied to the EP device from somewhere external, such as from an attendant computer, camera, scanner, PDA, laptop, etc. A controller 24 receives the image data at an input 26 and configures an appropriate output, such as video signal 28, after processing through a processor unit 11, to produce a latent image of the image data. Ultimately, a hard-copy printed image 29 of the image data is obtained from the latent image. If print alignment and operating conditions of the EP device are well calibrated, the printed image 29 corresponds nearly exactly with the image data input 22. If not, the printed image has poor quality, especially in the form of a variety of misalignments.

With more specificity, the output, video signal 28 energizes a laser 30 to produce a beam 32 directed at a scanning mechanism 39, such as a torsion oscillator or resonant galvanometer. As the oscillator or galvanometer moves (indicated by oscillation wave lines 136) the beam 32 is reflectively cast to create beam lines 34a, 34b on either side of a central position 34. As a result, multiple scan lines in alternate directions are formed on a photoconductor 36, such as a drum, and together represent a latent image 38 of the image data supplied to the controller. Optically, certain lenses 40, mirrors or other structures exist intermediate to the photoconductor to transform the rotational scan of the laser beam reflected from the oscillator or galvanometer 39 into a substantially linear scan of the beam at the photoconductor 36, with substantially uniform linear scan velocity and with substantially uniform laser beam spot size along the imaging area of the drum.

To provide common reference for the beam lines, various sensors are employed. Preferably, a forward hsync sensor 42a and a reverse hsync sensor 42b are positioned near opposite ends of the photoconductor to provide a common reference for all forward scanning beam lines and all backward scanning beam lines, respectively. In addition to, or in lieu of the sensors 42a, 42b, forward and reverse hsync sensors may be positioned at 44a and 44b, upstream of the representative optics 40. Alternatively still, a single hsync sensor might be used with one or more mirrors placed variously to act as a second hsync sensor. Regardless, the outputs of these sensors (representatively given as line 43 from hsync sensor 42a) are supplied to the controller 24 for referencing correct locations of the scan line(s) of the latent images. Downstream of the latent image, and not shown, the printed image is formed by applying toner to the latent image and transferring it to a media, such as a sheet of paper. Thereafter, the media 45 with the printed image 29 exits the EP device, where users handle it for a variety of reasons. Path 23 between the controller 24 and the scanning mechanism 39 is simplified for clarity of illustration. Path 23 may include elements for adjusting parameters of the latent image such as an offset adjustment system.

Figure 3:
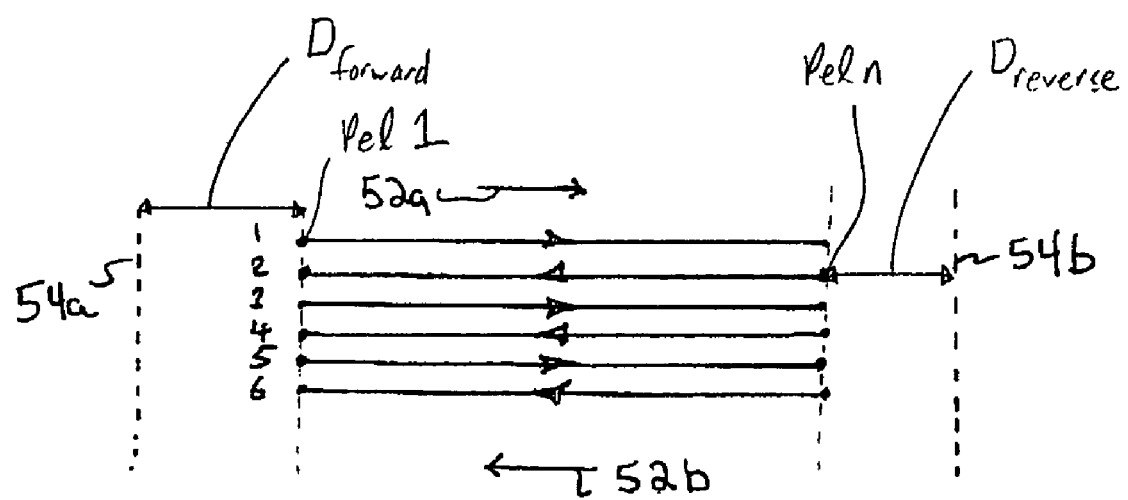
FIG. 3 is a diagrammatic view in accordance with the present invention of desirable scan lines and reference positions in a bi-directionally scanning EP device.

FIG. 3 conceptually shows the desired scan lines and reference positions in a bi-directionally scanning EP device and fairly suggests the nomenclature for use with later figures. Namely, a plurality of scan lines forming a latent image on a photoconductor, for example, are sequentially numbered 1-6, with odd numbered scan lines (1, 3, and 5) occurring in a forward scan direction 52a opposite the even numbered scan lines (2, 4, and 6) that occur in a backward scan direction 52b. Also, the forward and reverse scan lines alternate with one another and such is the nature of scanning with the torsion oscillator or resonant galvanometer of the EP device and its attendant formation of forward-scanning beam lines 34a and backward- or reverse-scanning beam lines 34b. Also, the reference position 54a supplies a common reference point for each of the forward scanning lines and may be borne about by the signal from the forward hsync sensor 42a. Conversely, the reference position 54b supplies a common reference point for each of the backward scanning lines and may be borne about by the signal from the reverse hsync sensor 42b.

Figure 4:
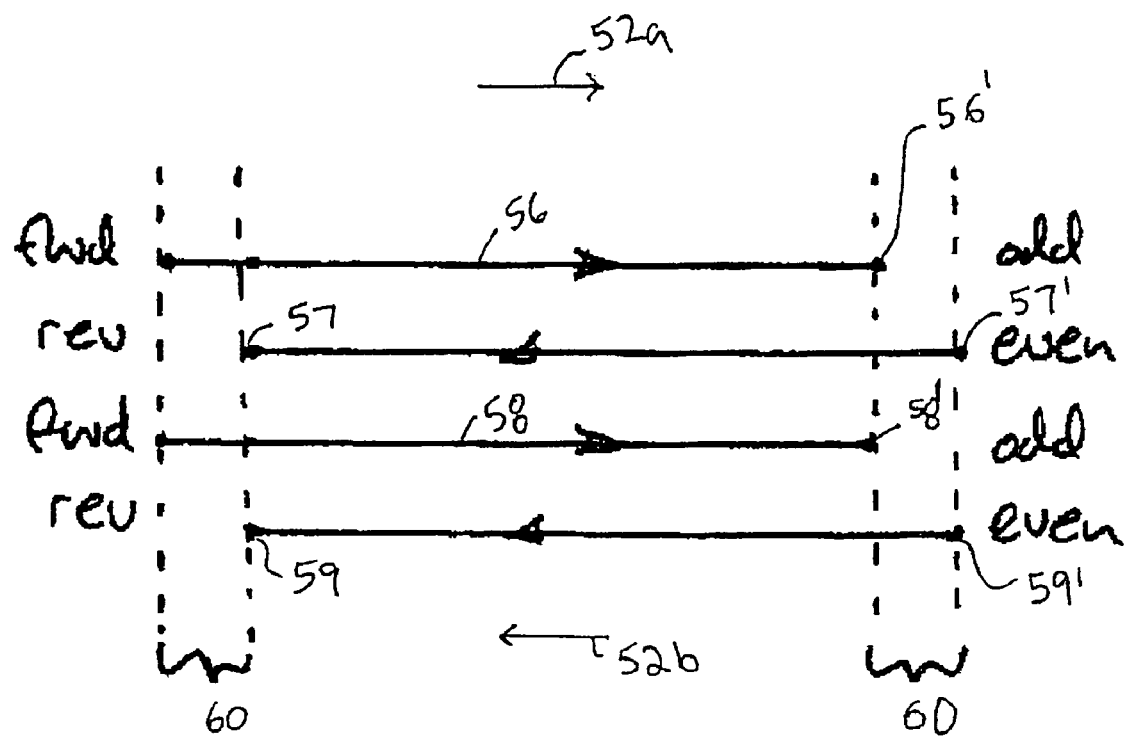
FIG. 4 is a diagrammatic view of one representative type of potential misalignment in a bi-directionally scanning EP device.

With reference to FIG. 4, one type of potential misalignment of bi-directional scans in an EP device occurs when the end points 56', 58' of forward (fwd) scan lines 56, 58 do not coincide with the start points 57', 59' of reverse (rev) scan lines 57, 59. Namely, the scan lines are all of relatively equal length thereby creating a nearly equal amount 60 of misplacement at each end of the scans. To avoid misalignment, it is of course desirable for the scan lines 56, 57, 58, and 59 to all align such that the first print element, or pel, in each direction is in alignment.

Figure 5:
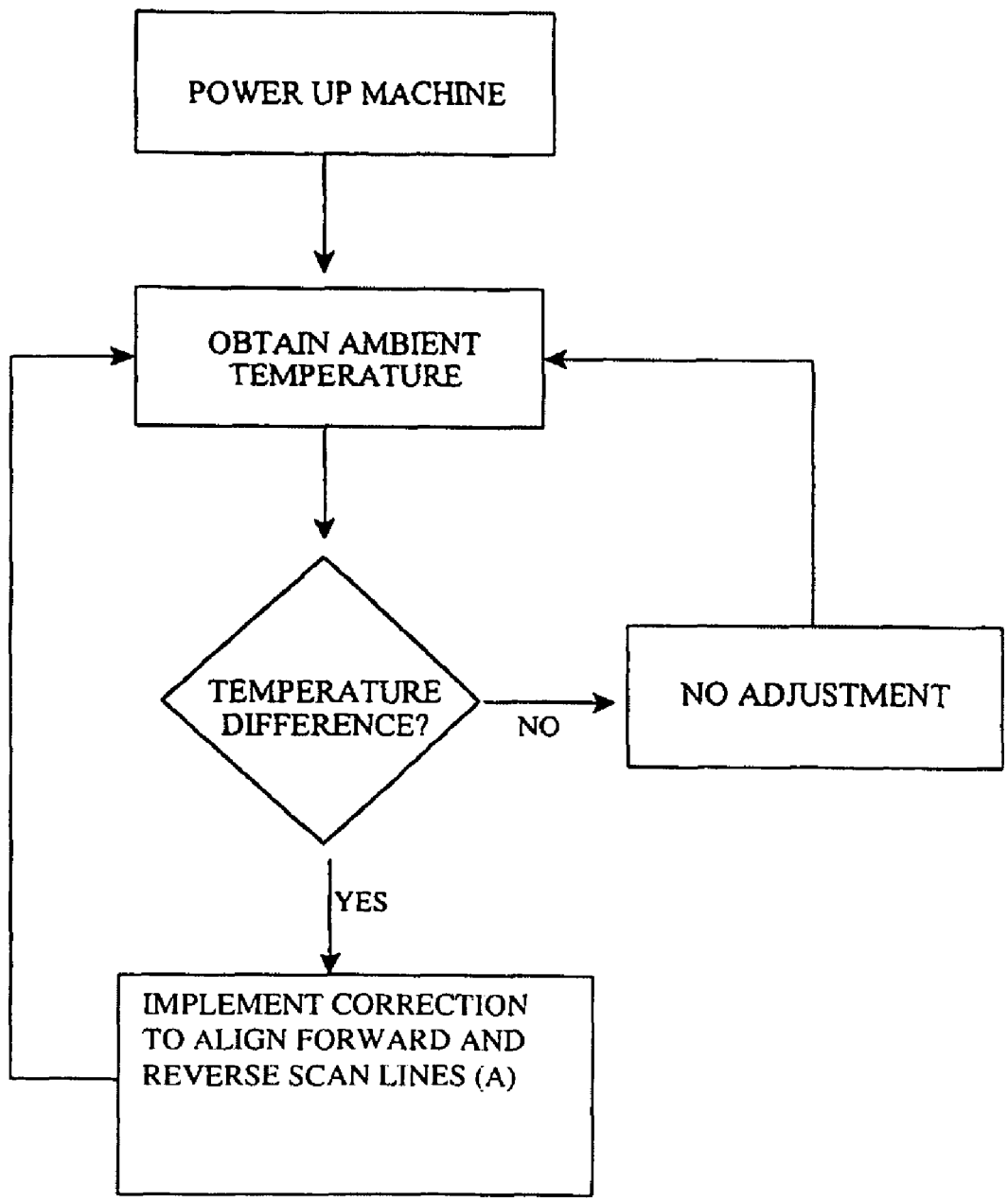
FIG. 5 is a flow chart illustrating one embodiment of the algorithm forming one aspect of the inventive method and device.

Appreciating the machine is subject to ambient operating conditions, such as temperature, it is desirable to obtain the ambient temperature and use the value to correct for possible misalignment of sequential lines during bidirectional scanning, and especially the misalignment shown above in FIG. 4. To do so, a temperature sensor 47 is provided to supply input to the controller 24 to correct the EP device. As shown in the flow chart of FIG. 5 and described in more detail in the following description, an algorithm A then uses the ambient temperature obtained to implement a correction in the output image signal 28 to help ensure proper alignment among the forward and reverse scan lines.

In placement, the sensor 47 can occupy any location internal or external to the EP device, although shown generally nearby the controller 24, within a housing 21. However, a more likely position for the temperature sensor 47 is nearby the laser 30 at position 48, for instance, to better ascertain the temperature of the structures that actually form the scan lines of the latent image. In form, the temperature sensor may representatively embody items such as a temperature sense resistor, a thermocouple, a thermistor, or any other detector influenced by thermal variations. Indeed, one particularly preferred embodiment is to use a thermistor associated with the card supporting either of the forward or reverse hsync sensors 42a, 42b as the temperature sensor 47.

The algorithm A applied involves using the measured temperature value to determine the amount of adjustment necessary to align the adjacent scan lines. In one embodiment, this is accomplished by applying the measured temperature difference to a formula obtained using empirical data correlating the average misalignment of a bidirectional scanning mechanism 39 with temperature. Using this data, the following linear formula was derived:

$$y = 2.2642\, x + 15.639$$

where:
x is the temperature difference from the measured or ambient value to a nominal value representing general alignment of the forward and reverse scan lines, in degrees Celsius; and
y is the change in bi-directional alignment resulting from the temperature change, in micrometers.

Figure 6:
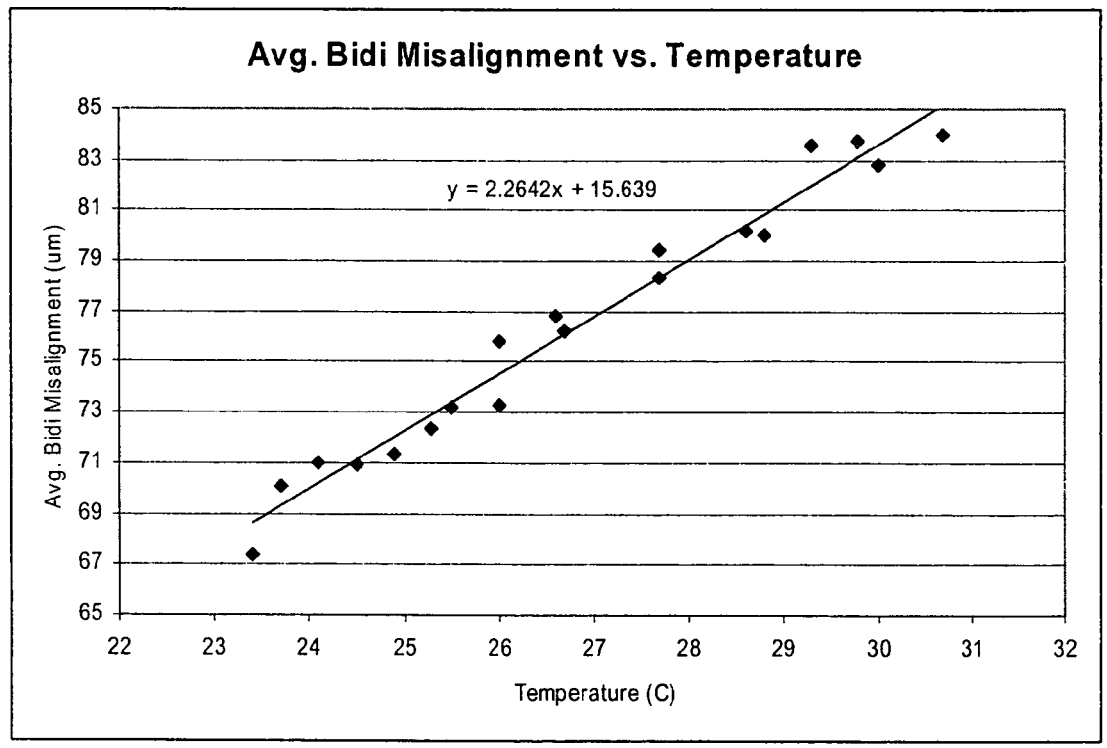
FIG. 6 is a graphical illustration comparing the average misalignment of a bi-directional scanning device versus temperature.

The empirical data from which this formula arises is represented graphically in FIG. 6, which plots the average misalignment for a bidirectional scanner (which may be measured experimentally, such as by scanning a calibration page or other known means) against the change in ambient operating temperature. Since the y-intercept value of 15.639 represents the initial misalignment, the concern for purposes of the correction is the slope of the line, or the 2.2642 x portion of the equation. Accordingly, the y-intercept is disregarded.

Figure 7:
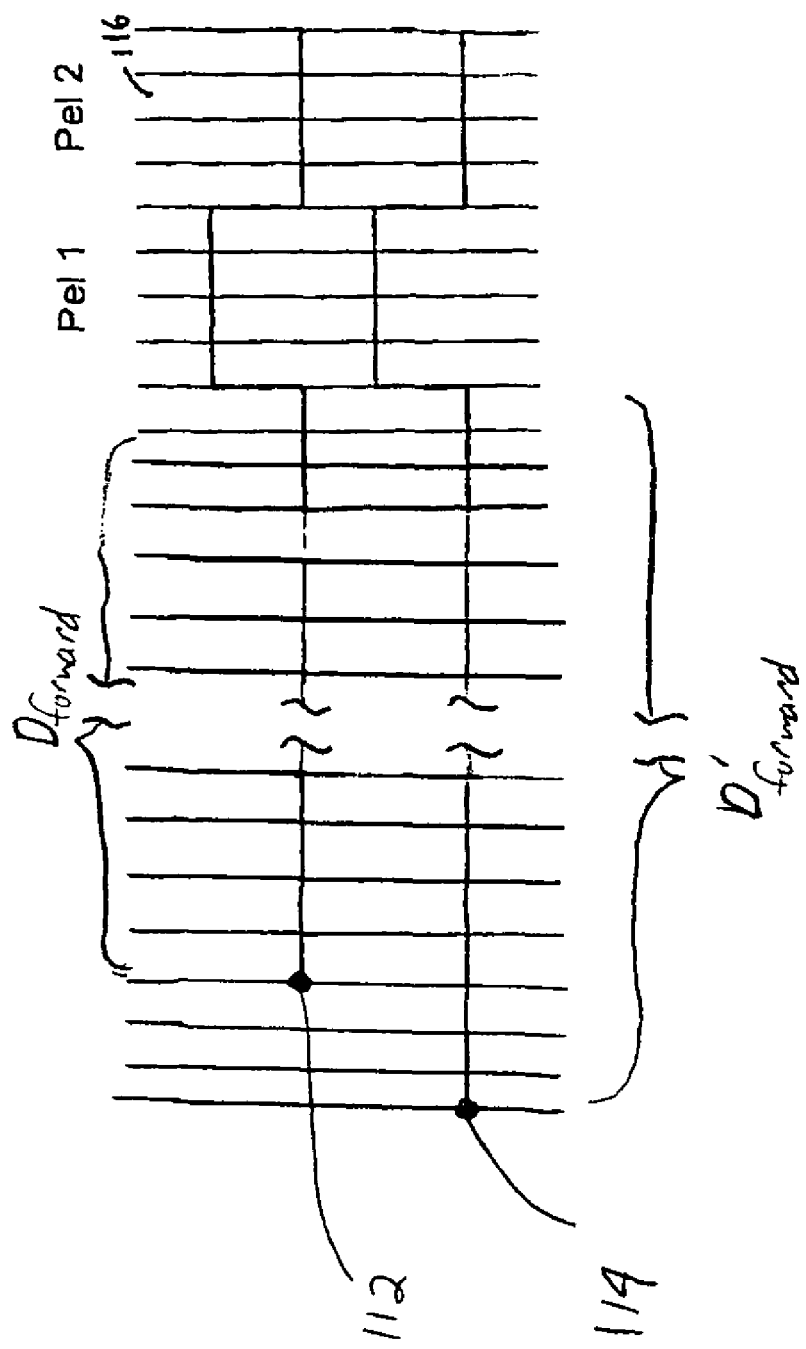
FIG. 7 is a diagrammatic view illustrating the difference between a nominal forward scan line and a forward scan line adjusted to compensate for a temperature differential to ensure alignment with a corresponding reverse scan line.

With reference to FIGS. 2 and 7, an output video signal 28 of controller 24 either embodies a nominal line 112 or a corrected line 114 for scanning a latent image in terms of pixel (pel) information. In the former, the pixel information of the nominal line exactly or fairly closely resembles the pixel information of the image data input 22. In other words, little if any misalignment is expected and the input can be supplied directly as an output to create a scan line of a latent image. In the latter, and more realistically, a certain amount of misalignment per temperature is created, and the pixel information for scanning a latent image requires alteration from the image data input at 22 so as to minimize misalignment in the printed image output 29. Representatively, the alteration occurs by delaying the pixel information from the image data input.

Pixel, or "pel" information is sometimes known to have subsets, such as slices 116, based primarily on a system clock of the controller. To adjust the alignment among adjacent scan lines of the latent image, the pixel information for creating one of the scan lines can be delayed by one or more slices. In still other words, a scan line is quantized into discrete slices, or regions in which the scanning laser may be either on or off. Quantization follows the modulation clock, since transitions between off and on states must occur between clock cycles, though each slice is generally a fraction of a pel (e.g., ¼ pel slices).

According to one aspect of the invention, one manner of making the adjustment to account for temperature involves aligning the forward and reverse scans during machine calibration, such that pel 1 in the forward scan and the corresponding pel (such as Pel n in a line having n pels) in the reverse scan align with each other. Proper alignment can be determined, for example, by printing and scanning a test page during the manufacture or assembly of the machine to evaluate the position of the forward and reverse scan lines. The temperature value at which the alignment is achieved is stored, such as in NVRAM 49 associated with the controller 24, for later use in the algorithm A.

At some point during later operation, such as on start up (that is, when the machine is powered on) or periodically during operation, the current output from the temperature sensor 47 is used to help correct any misalignment of the forward and reverse scan lines based on a calculated difference in temperature. In particular, the misalignment distance value, y, obtained from the slope portion of the above-referenced formula is used to adjust and align the scans in the forward and reverse direction creating the latent image to help correct for temperature-based effects on the associated hardware.

In one embodiment, the adjustment is made by altering the "detect to print" value, which is the predetermined distance from the respective hsync sensor to the first Pel of the scan line of the latent image forming part of the video signal 28. As shown in FIG. 3, in a bi-directional scanner, there is a forward detect to print distance, $D_{forward}$, for the forward scan line, and a reverse detect to print distance, $D_{reverse}$, for the reverse scan line. The adjustment calculated using the above-referenced formula may be applied by calculating a suitable number of Pel slices to insert and add the necessary distance to increase the rendering of the first Pel. The adjustment may be applied to the forward detect to print distance, $D_{forward}$, the reverse detect to print distance, $D_{reverse}$, or partially to both scan lines, such as by adding a suitable delay in terms of Pels or Pel slices to the video signal 28 in advance of the pixel information (compare $D_{forward}$ for line 112 with $D_{forward}'$ for line 114). In any case, the alignment between the adjacent scan lines is improved as compared to the situation if temperature is not monitored and alignment kept in check over time.

The following examples illustrate possible applications of the inventive technique, as are not intended to limit the invention to any particular form.

EXAMPLE

The machine is calibrated during assembly such that the forward and reverse scans align at a temperature of 25° C. (that is, Pel 1 in the forward scan aligns with or, stated another way, generally starts as the same point on the photoconductive drum as, Pel n in a line of length n in the reverse scan, or vice-versa). On machine startup at some point later during operation in the field, the ambient temperature is checked using sensor 47. If the temperature obtained by the sensor 47 is 45° C., the algorithm A proceeds to calculate the difference from the stored alignment temperature as 20° C. Since the temperature is different, the algorithm A calculates the correction necessary to help align the forward and reverse scan lines as follows:

$$y = 2.2642(20) = 45.284\ \mu m$$

At 600 dpi, a single Pel is approximately 42.3 μm in width, and as noted above, adjustments are made in quarter Pel increments. Therefore, four slices (42.3 μm) are inserted in the video output signal 28, either as part of the forward detect to print distance, the reverse detect to print distance, or divided between both, to reduce the misalignment of each pair of scan lines that serve to create the latent image. In the foregoing example, this would reduce the misalignment from 45.284 μm to 2.984 μm. The result is a condition in which the forward and reverse scan lines are generally aligned, despite the temperature differential.

Ultimately, the foregoing overcomes the expected amount of misalignment in an EP device resulting from temperature differences and print quality is improved. Naturally, skilled artisans will know that other amounts of delay can be implemented as well as implementing correction schemes other than the delay/slice insertion and still overcome the expected misalignment per temperature. One of ordinary skill in the art will also recognize that additional embodiments of the invention are also possible without departing from the teachings herein. This detailed description, and particularly the specific details of the exemplary embodiments, is given primarily for clarity of understanding, and no unnecessary limitations are to be imported, for modifications will become obvious to those skilled in the art upon reading this disclosure and may be made without departing from the spirit or scope of the invention. Relatively apparent modifications, of course, include combining the various features of one or more figures with the features of one or more of other figures.

The invention claimed is:

1. A method of improving print quality of a bi-directionally scanning device forming forward and reverse scan lines, comprising:
   obtaining an ambient temperature under which the device is operated; and
   implementing a correction based on the obtained temperature to align the forward and reverse scan lines by calculating a number of pel slices equivalent to the correction, wherein implementing the correction comprises delaying the creation of first scan line pixels of a latent image in both the forward and reverse scanning directions such that each scan line of the latent image includes delayed first scan line pixels, the correction being divided between the delay in the creation of the first scan line pixels in the forward scanning direction and the delay in the creation of the first scan line pixels in the reverse scanning direction.

2. The method of claim 1, wherein the implementing the correction comprises correlating positional misalignment to a signal for operating a laser to make one of the forward and reverse scan lines.

3. The method of claim 1, wherein the implementing the correction comprises comparing the obtained temperature to a temperature at which the forward and reverse scan lines generally align, and then determining the amount of a correction necessary based on the comparison.

4. The method of claim 3, wherein the method further includes storing in a memory the temperature at which the forward and reverse scans generally align.

5. The method of claim 1, wherein the step of obtaining the ambient temperature is completed after the device powers on.

6. The method of claim 1, wherein the steps of obtaining the ambient temperature and implementing a correction are repeated periodically.

7. The method of claim 1, wherein the correction based on the obtained temperature is calculated directly from the obtained temperature. A method of improving print quality of a bi-directionally scanning electrophotographic device forming forward and reverse scan lines, comprising:
   measuring a temperature under which the device is operated; and
   implementing a correction calculated directly from the measured temperature to align the forward and reverse scan lines.

8. The method of claim 1, wherein the calculated number of pel slices are inserted in a video signal carrying data to be printed.

9. The method of claim 1, wherein the calculated number of pel slices are inserted in a video signal carrying data to be printed.

10. Bi-directionally scanning electrophotographic device, comprising:
    a photoconductor for receiving a plurality of scan lines formed in opposite directions to create a latent image;
    a controller for producing the latent image on the photoconductor with a signal altered from an image data input signal, wherein the signal altered includes pixel information delayed by an amount correlated to a positional misalignment as a function of a temperature in which the device is operated; and
    an algorithm for correcting the positional misalignment of both forward scan lines and reverse scan lines to create the latent image, the forward and reverse scan lines being in opposite directions, each forward and reverse scan line of the latent image being corrected with delayed pixel information such that the correction is divided between the delayed pixel information in the forward scan lines and the delayed pixel information in the reverse scan lines.

11. The device of claim 10, further including an algorithm of the controller that calculates the amount of the signal altered as a fractional amount of the pixel information.

12. The device of claim 10, further including a sensor for measuring the temperature.

13. The device of claim 10, further including a memory including a stored temperature value corresponding to alignment of the forward and reverse scan lines.

14. The device of claim 13, wherein the algorithm compares the temperature with the stored temperature value to determine the misalignment among the forward and reverse scan lines.

* * * * *